Figure 1:
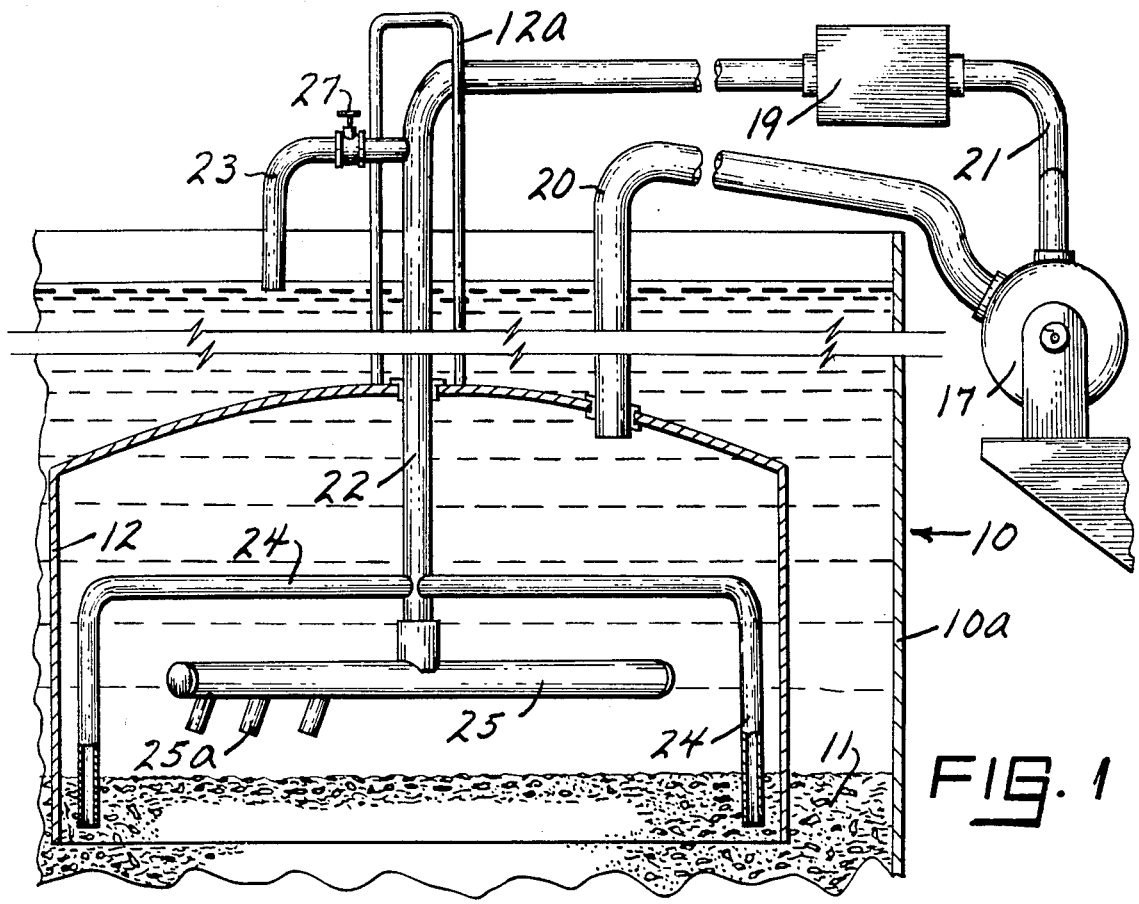

United States Patent [19]

Whitman

[11] Patent Number: 4,725,353
[45] Date of Patent: Feb. 16, 1988

[54] AQUARIUM CLEANING ARRANGEMENT

[76] Inventor: Leslie D. Whitman, R. 2, Greenville, Ky. 42341

[21] Appl. No.: 941,321

[22] Filed: Dec. 15, 1986

[51] Int. Cl.⁴ .......................... E04H 3/20; A01K 63/04
[52] U.S. Cl. .................................. 210/169; 210/416.2; 119/5; 134/111
[58] Field of Search ................. 210/169, 416.2; 119/5; 134/111, 179

[56] References Cited

U.S. PATENT DOCUMENTS

| | | | |
|---|---|---|---|
| 2,597,931 | 5/1952 | Hance | 134/179 |
| 2,602,003 | 7/1952 | Wellborn | 134/179 |
| 2,672,987 | 3/1954 | Hutchinson | 119/5 |
| 2,956,507 | 10/1960 | Hutchinson | 119/5 |
| 3,630,364 | 12/1971 | Johnston | 210/169 |
| 3,734,853 | 5/1973 | Horvath | 210/169 |
| 4,094,788 | 6/1978 | Dockery | 210/169 |
| 4,233,702 | 11/1980 | Zweifel | 210/169 |

*Primary Examiner*—Richard V. Fisher
*Assistant Examiner*—Coreen Y. Lee
*Attorney, Agent, or Firm*—Warren D. Flackbert

[57] ABSTRACT

An aquarium cleaning arrangement characterized by the use of an open bottomed casing for selectively defining the boundary of a portion of the pebbles and/or gravel in an aquarium, and where water is pumped into the casing to achieve agitation therwithin and to dislodge and remove unwanted settled debris. A water recirculating arrangement is provided which includes a pump, a filter, and a water discharge system within the casing, the latter presenting stationary or fixed water jets extending into the pebbles and/or gravel and a rotatable member driven by water flow passing through angled outlet jets thereon. Provision is made for valving, forming part of the water recirculating arrangement, to achieve filtering of all water in the aquarium, i.e. including that which is outside of the casing.

4 Claims, 2 Drawing Figures

U.S. Patent  Feb. 16, 1988  4,725,353

AQUARIUM CLEANING ARRANGEMENT

As is known, the popularity of aquariums, either for homes or even offices, is widespread. A significant problem to the owner, however, is in connection with maintenance, i.e. to assure that the water is clean and/or that there is no accumulation of settled debris, as food particles, or the like. Present cleaning approaches have mostly proven to be troublesome, oftentimes requiring aquarium emptying, gravel and/or pebble removal, and the subsequent replacement of the latter after cleaning. A need is apparent, therefore, for a simple and yet effective arrangement for cleaning aquariums.

The invention serves such a purpose, i.e. presents an arrangement which is successively movable throughout the bottom area of the aquarium for achieving the desired cleaning. In this connection, and briefly, water is introduced into a casing which surrounds and defines the portion of the aquarium bottom which is to be cleaned. The preceding is accomplished by a series of fixed water jets or outlets and, additionally, a water outlet which is rotatable in a horizontal plane. The purpose of the water flow is to dislodge unwanted debris from the bottom of the aquarium, where such, when loosened, flows upwardly and is pumped from the aquarium through a recirculating system which includes a conventional filter.

In other words, and through the provision of a handle for the casing and flexible conduits, the instant arrangement is readily moved from one operational site within the aquarium to another. Additionally, a cut-off valve, forming part of the water system, serves for the selective filtering of all water in the aquarium, i.e. including that outside of the aforesaid casing.

Figure 2:
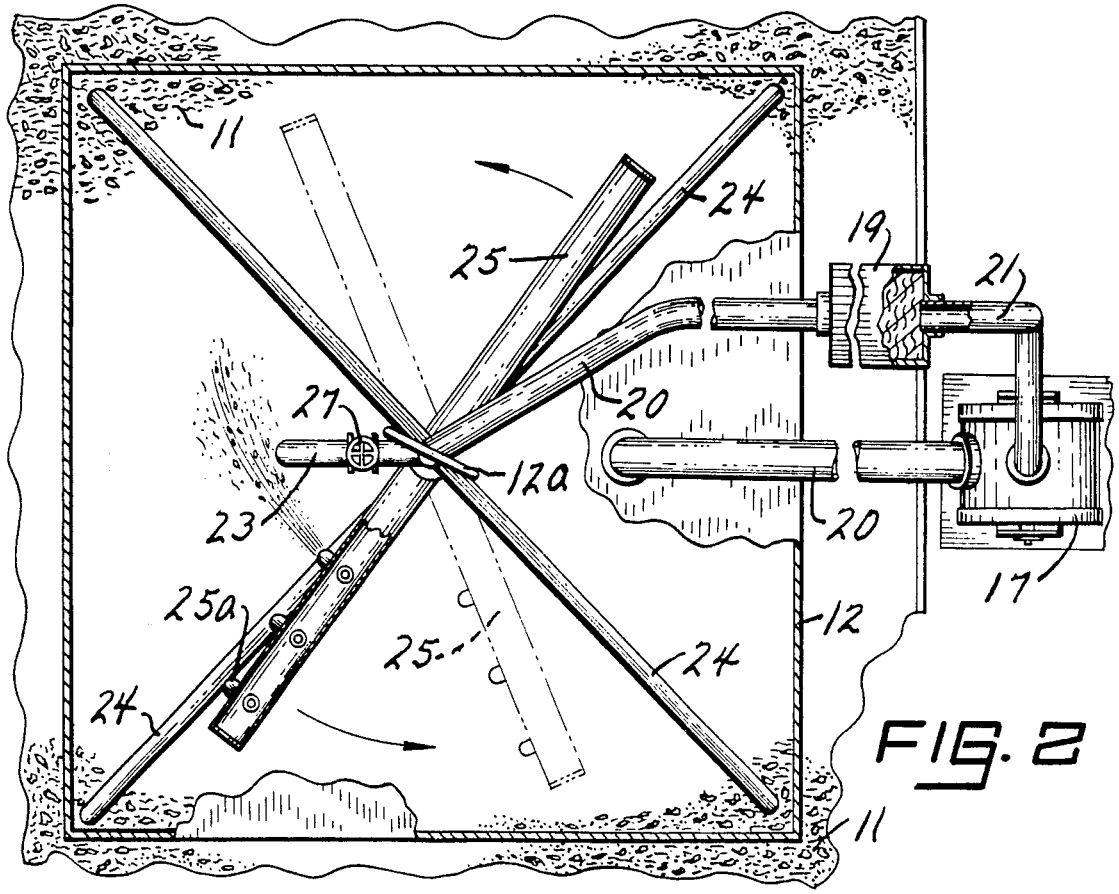

In any event, a better understanding of the present invention will become more apparent from the following description, taken in conjunction with the accompanying drawing, wherein FIG. 1 is a view in side elevation, partly in vertical section, showing an aquarium cleaning arrangement in accordance with the teachings of the present invention; and, FIG. 2 is a plan view of the invention, corresponding to FIG. 1, but looking from the top to the bottom thereof.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, a conventional aquarium 10 is partially disclosed, including side walls 10a and the customary layer of pebbles and/or gravel 11 at the bottom. The invention presents an open bottomed casing or housing 12, typically made from a clear molded plastic, which is successively movable by a handle 12a to preselected areas of the pebbles and/or gravel 11 for cleaning purposes.

The invention includes a water recirculating arrangement powered by a conventional pump 17, with an associated filter 19, and where a conduit 20 communicates between the pump 17 and the inside of the casing 12. Another conduit 21 interconnects the pump 17 and the filter 19. Still another conduit 22 interconnects filter 19 and a water discharge system disposed within the casing 12.

The water discharge system typically includes fixed arms 24 extending into the pebble and/or gravel 11 and a member 25 rotatable in a horizontal plane for increased water agitation. As evident in the figures, water outlet ports or jets 25a, disposed on member 25, are angled, serving to achieve the desired rotation by water force (see the directional arrows in FIG. 2 and the phantom line representation of member 25 at another position in the path of rotational travel).

The water recirculating system further includes a hand-operated valve 27 communicating with conduit 22 and forming part of a conduit 23 which empties into the aquarium outside of the casing 12. Valve 27 controls, to a certain extent, operation or rotation of member 25, since, if in a closed condition, the water will take a direct flow path through conduit 22 and the water discharge system. On the other hand, if valve 27 is in an opened condition, the water in the entire aquarium will be filtered, where the return path to pump 17 includes the pebbles and/or gravel 11 within and beneath the casing 12.

In any event, and as should be evident, the instant aquarium cleaning arrangement serves an effective approach for cleaning the layer of debris laden pebbles and/or gravel 11 on the bottom, i.e. by selectively moving the casing 12 over desired portions of the pebbles and/or gravel 11 and agitating the water therewithin to permit debris dislodging and subsequent removal by pumping action. Not only is water introduced into the pebbles and/or gravel 11 at each of the corners of the casing 12, but, the member 25, rotatable by the force of incoming introduced water, serves added agitation and dislodging purposes.

The aquarium cleaning arrangement described above is susceptible to various changes within the spirit of the invention including, by way of example, the configuration of the casing in plan view; the number of jets on the rotatable member 25; the particular material forming the layer on the bottom of the aquarium; and, the like. Thus, the preceding should be considered illustrative and not as limiting the scope of the following claims:

I claim:

1. A cleaning arrangement for an aquarium having side walls and a bottom wall covered by a layer of pebbles-gravel, comprising an open bottomed casing extending into a preselected area of the pebbles-gravel layer, and a water recirculating arrangement including a pump, a filter, and a water discharge system disposed within said casing for water agitation including a water outlet member rotatable in a horizontal plane having an angled jet serving rotation producing purposes, where conduit means interconnect said casing, said pump, said filter and said water outlet member of said water discharge system.

2. The cleaning arrangement of claim 1 where said water discharge system also includes stationary arms extending into said layer of pebbles-gravel for water passage.

3. The cleaning arrangement of claim 1 where valve means forms part of said water recirculating arrangement and when at an open condition permits filtering of all water within and outside of said casing.

4. A cleaning arrangement for an aquarium having side walls and a bottom wall covered by a layer of pebbles-gravel, comprising an open bottomed casing extending into a preselected area of the pebbles-gravel layer, and a water recirculating arrangement including conduit means communicating with said casing and a pump, other conduit means interconnecting said pump and a filter, and still other conduit means interconnecting said filter and terminating in a water discharge system disposed within said casing, said water discharge system including a water outlet member rotatable in a horizontal plane, said water outlet member including an angled jet receiving water to be discharged from said still other conduit means, and said pump being arranged to discharge said water through said angled jet to rotate said water outlet member.

* * * * *